3,486,673
METHOD OF CUTTING GLASS
Joseph G. Madge, Dearborn, Mich., assignor to Ford Motor Company, Dearborn, Mich., a corporation of Delaware
Filed Mar. 8, 1968, Ser. No. 711,568
Int. Cl. B26f 3/00; B65h 35/00; B26d 3/08
U.S. Cl. 225—2                                                 6 Claims

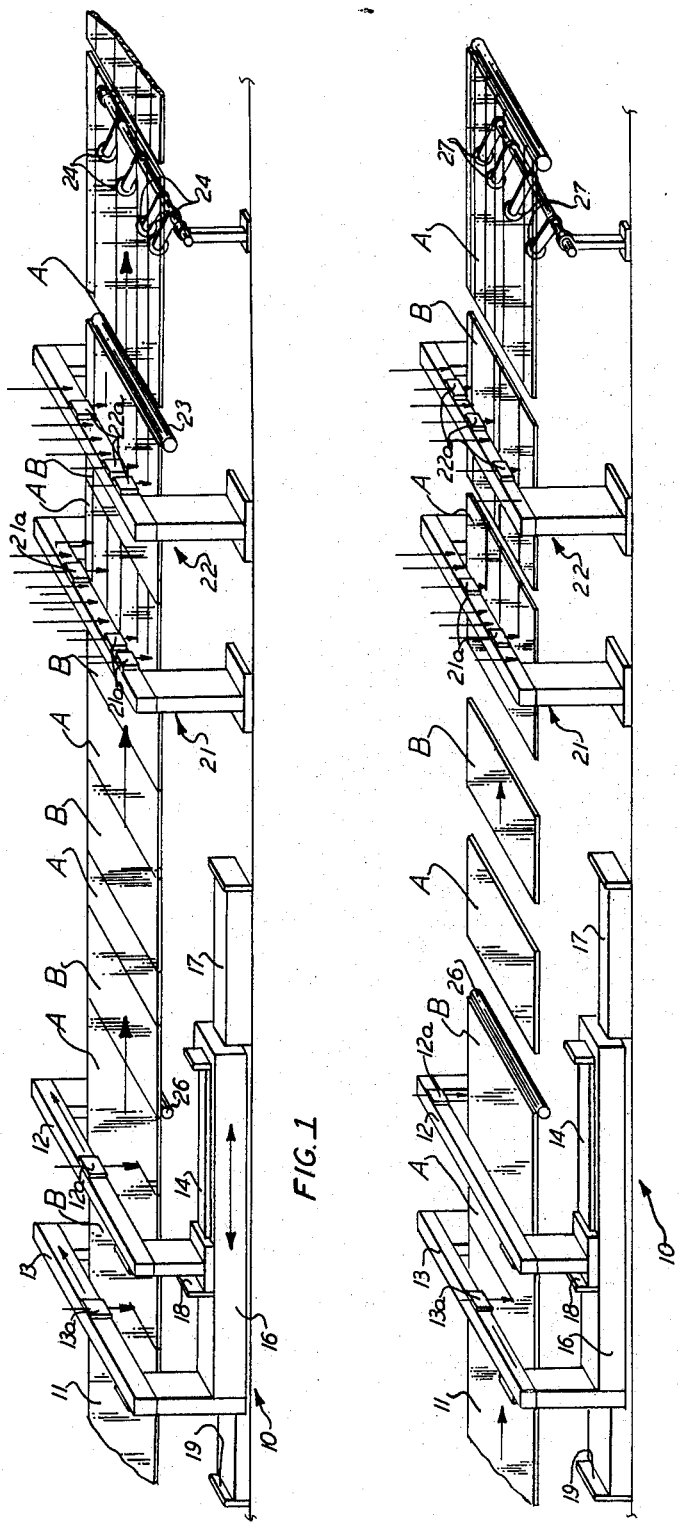

ABSTRACT OF THE DISCLOSURE

A method of cutting a ribbon of glass into individual glass brackets has the following steps. The ribbon is scored across its width at spaced intervals to define separate glass panels. One of the glass panels is scored along its length at a first location to define a plurality of glass brackets in the one panel. The other panel is scored along its length at a second location to define a plurality of glass brackets in the other panel. The panels and brackets are thereafter separated by selective application of a breaking force to the glass along the score lines thereon.

BACKGROUND OF THE INVENTION

In conventional glass cutting procedures a continuous ribbon of glass is produced by a glass making process and delivered to glass cutting equipment. The first step of the glass cutting process is to define individual glass panels in the glass ribbon by means of a cross-scoring machine. The cross-scoring machine scores the glass ribbon across its width at spaced intervals along its length. The area between two adjacent cross-scores defines a single panel of glass. The single panel is scored along its length to define individual glass brackets by a scoring machine spaced downstream of the cross-scoring machine. The panels and brackets are separated from one another by selective application of breaking forces to the glass which causes the glass to break along the scores thereon.

This conventional cutting process has proved acceptable when utilized with conventional glass making processes. However, in the last few years a glass manufacturing process known as the "float process" has been introduced for the commercial manufacture of flat glass. This process produces a continuous, high quality ribbon of glass at a relatively high number of square feet per hour. The method of this invention has been designed especially for use in conjunction with the cutting of a glass ribbon produced by the float process. The method has been developed to provide an efficient method of cutting glass brackets of varying sizes from glass panels defined in a glass ribbon as the ribbon is moved along a predetermined path.

SUMMARY OF THE INVENTION

This invention relates to a method of cutting glass and, more particularly, to a method of cutting individual glass brackets from a ribbon of glass as the glass ribbon is moved continuously along a predetermined path.

The method of this invention has the following basic steps. The glass ribbon is scored at spaced intervals across the width thereof so as to define two separate panels in the ribbon, a single panel being defined between adjacent scores. This cross-scoring takes place at a first station positioned along the predetermined path. One of the defined glass panels is subsequently scored along the length thereof so as to define a plurality of glass brackets in the one panel. The scoring of the one panel takes place at a second station spaced downstream along the predetermined path from the first station. The other of the defined glass panels is also scored along its length so as to define a plurality of brackets therein. The scoring of the other panel takes place at a third station spaced downstream along the predetermined path from the second station.

In greater detail, the method of this invention is concluded to produce the plurality of glass brackets by the further step of separating the glass panels and brackets from one another by applying a selective breaking force to the glass ribbon along the scores thereon.

Thus, the method of this invention facilitates the cutting of alternate glass panels into glass brackets by scoring each of the separate glass panels defined in the ribbon at a separate scoring station. One scoring station operates on one of the glass panels defined in the cross-scoring of the glass while the other scoring station operates on the other glass panel defined in the cross-scoring operation. With such a method the sizes of glass brackets produced in each of the individual panels may be varied so that different shapes can be produced from the glass in each of the panels.

BRIEF DESCRIPTION OF THE DRAWINGS

FIGURE 1 is a schematic drawing of equipment practicing a method of this invention. FIGURE 2 is also a schematic drawing of equipment practicing a method of this invention.

DESCRIPTION OF THE PREFERRED EMBODIMENT

In FIGURE 1 there is schematically shown equipment for practicing a method in accordance with the teachings of this invention. The primary piece of equipment is a cross-scoring machine, generally identified by the numeral 10. This machine scores across the width of the top surface of a continuous ribbon of glass 11 as the ribbon is conveyed along a predetermined path past the machine. The glass ribbon may be manufactured in the manner described in the Basler et al. U.S. patent application Ser. No. 674,605, filed Oct. 11, 1967, and assigned to the same assignee as this application. The exact method in which the glass ribbon is manufactured does not form a part of this invention so no further description thereof will be given herein.

The cross-scoring machine 10 is of conventional design and it has two bridges 12 and 13 thereon respectively supporting movable scoring heads 12a and 13a, each scoring head carrying a glass scoring tool therein. The bridge 12 is movably mounted on a guide track 14. The guide track 14 is in turn secured to and located along a supporting and base portion 16 of the bridge 13. The supporting and base portion of the bridge 13 is in turn movably mounted on a guide track 17, which guide track is rigidly attached to a supporting structure such as a concrete base. In a rest position the bridge 12 is in engagement with a rear stop 18 of the guide track 14 and the bridge 13 is in engagement with a rear stop 19 of the guide track 17.

The conventional cross-scoring machine 10 functions such that when scores are to be placed across the glass ribbon passing thereunder, the leading score is made by the scoring head 12a and the trailing score is made by the scoring head 13a. More particularly, the bridge 12 is positioned on the guide track 14 at a fixed distance from the bridge 13. The position of the bridge 12 with respect to the bridge 13 determines the distance between the two score marks to be placed on the glass ribbon. When the glass ribbon passing under the head is to be scored, both scoring heads 12a and 13a are actuated to move simultaneously across their respective bridges 12 and 13 from left to right as viewed in FIGURE 1. Since the glass ribbon 11 is moving to the right as viewed in FIGURE 1, the scoring heads 12a and 13a, in order to score straight across the ribbon, must be moved therewith. To accomplish this movement the supporting and base portion 16 of the bridge 13 is propelled along its associated guide track 17 at a velocity sufficient to maintain the scoring heads in a precise location with respect to the glass ribbon as the heads move across the glass. Thus, the glass ribbon is scored across the width thereof so as to define individual panels which, for the purpose of this specification, will alternately be labeled A and B panels in FIGURE 1. The use of a cross-scoring machine having two bridges is occasioned when adjacent scores, necessary to define a single panel, are so closely spaced that a single scoring head cannot travel across the ribbon with sufficient speed to be repositioned to make the next score.

At positions spaced downstream of the cross-scoring machine 10 are two separate cordwood scoring machines, generally identified by the numerals 21 and 22. The cordwood scoring machines each have associated therewith a plurality of scoring heads 21a and 22a, respectively, which support scoring tools therein. The scoring heads 21a and 22a may be adjusted laterally across the width of the glass so as to permit positioning of the heads in exact positions with respect to the glass ribbon passing thereunder. Such positioning either may be accomplished manually or may be controlled by a computer and interconnected adjusting mechanisms associated with each of the scoring heads. In either case, the cordwood machines 21 and 22 are so controlled that the machine 21 scores only the A panels of glass whereas the machine 22 scores only the B panels of glass. Thus, alternate panels of glass are scored along their length by different ones of the cordwood machines. The scoring heads of each of the cordwood machines may be adjusted to different positions so that the score pattern placed on the respective panels is different.

When panel A passes under cordwood machine 21, the machine is actuated so that the scoring heads 21a thereon are moved into engagement with the top surface of the glass panel A passing therebelow whereby a plurality of scores are placed upon the panel along its length. The scores on the panel divide the panel into a plurality of glass brackets. As the panel B approaches the scoring heads 21a, the machine 21 is actuated and the heads thereof are moved up out of engagement with the glass panel A at least 1/32 inch before panel B comes into contact with the scoring heads. Panel B passes under the cordwood scoring machine 21 without contacting the scoring heads 21a. When panel B comes under the cordwood machine 22 the scoring heads 22a thereon are actuated and brought into engagement with the top surface of panel B. The scoring heads 22a are preferably moved into engagement with the panel B within 1/32 inch from the cross-score defining the end of panel A. Panel B is thus scored along its length until the scoring heads 22a approach within 1/32 inch of the end of panel B at which time the machine 22 is actuated to move the scoring heads thereon upwardly out of engagement with the glass. The mechanisms for moving the scoring heads 21a and 22a into and out of engagement with the respective glass panels are conventional and no further description thereof will be given herein.

After the respective panels have been scored along the length thereof they are then moved onto a conventional breaker roll 23 which applies pressure across the width of the glass. The pressure applied breaks the glass along the scores across the width thereof. The individual panels A and B then pass over a plurality of breaker rolls 24 in the form of small rotatable wheels which, by lifting the glass up at the location of the scores along the length thereof, effectively apply breaking forces along the scores which cause the glass panel to break into a plurality of individual glass brackets. This completes one method of this invention.

Reference is now made to FIGURE 2 which shows schematically the equipment described in FIGURE 1. The equipment, however, is practicing another method of cutting glass in accordance with the teachings of this invention.

In the method performed in conjunction with the equipment of FIGURE 2, the cross-scoring machine 10 is operated such that the bridge 13 carrying the scoring head 13a thereupon is the only bridge operative to place a score across the width of the glass ribbon 11. In this particular case only the scoring head 13a is operative because sufficient space is provided between the separate cross-scores to permit the single head to move back and forth across the glass to make all the necessary cross-scores thereon. In such a case the scoring head 12a on bridge 12 remains inoperative.

As was described in conjunction with FIGURE 1, the bridge 13 is moved on the track 17 along with the glass when the scoring head 13a is moving across the glass ribbon 11. When the scoring heat 13a completes its move across the glass ribbon, the bridge 13 is returned to its rear stop 19 before the next cross-score of the glass is made by the head. In the method employed in conjunction with the equipment of FIGURE 2, a breaker roll 26 is positioned across the width of the glass 11 immediately after the cross-scoring machine 10. The purpose of this breaker roll is to apply breaking pressure on the cross-scores thus to separate the various panels of glass from the ribbon 11 immediately after the cross-scoring operation. Thus are formed a plurality of panels which again are identified as A and B panels.

The individual glass panels proceed along the predetermined path downstream from the cross-scoring machine 10 and eventually pass under the cordwood scoring machines 21 and 22. As described in conjunction with the equipment of FIGURE 1, the cordwood scoring machines 21 and 22 are selectively actuated so that they bring their scoring heads into engagement with the alternate panels A and B. Thus, the cordwood scoring machine 21 places scores along the length of each panel A whereas the cordwood scoring machine 22 places scores along the length of each panel B. As an A panel passes under scoring machine 22 or a B panel passes under scoring machine 21, the scoring heads of the associated machines are in a withdrawn position and do not engage the glass. The individual glass panels A and B then pass from the associated cordwood scoring machine to a plurality of breaker rolls 27, in the form of rotatable wheels, which are below the predetermined path of travel of the glass panels. These breaker rolls lift the glass slightly at spaced points across the width of the glass panel and thereby cause the glass to break along the longitudinal scores thereon. Thus, each of the individual glass panels A and B are separated into a plurality of glass brackets.

The most important feature of the method of this invention is that a variety of shapes may be cut from a glass ribbon on a continuous basis. For example windshield brackets may be cut from the A panels while automotive side window brackets are cut from the B panel. Thus, at a single time brackets for two different glass products may be produced. In a different manner, the cordwood scoring machines may have the scoring heads thereon attached to lead screws controlled by motors, the actuation of the motors being controlled by a computer. The individual scoring heads may be reset between alternate glass panels passing thereunder so that every other glass panel may have a different score pattern thereon whereby a plurality of glass brackets of various sizes are produced at the same time.

The invention disclosed will have many modifications which will be apparent to those skilled in the art in view of the teachings of this specification. For example, the scoring tools for scoring the glass panels into a plurality of glass brackets may be located on a single bridge structure and alternately brought into engagement with respective panels as the panels pass under the scoring tools.

What is claimed is:

1. A method of scoring a ribbon of glass into individual glass brackets as the glass ribbon is moved continuously along a predetermined path, which method comprises:

scoring the glass ribbon at spaced intervals across the width of the continuous ribbon so as to define two separate panels in the ribbon, said initial scoring taking place at a first station positioned along the predetermined path;

scoring one of said defined glass panels along the length thereof so as to define a plurality of glass brackets in said one panel, said scoring of said one panel taking place at a second station spaced downstream along the predetermined path from said first station; and scoring the other of said defined glass panels along the length thereof so as to define a plurality of glass brackets in said other panel, said scoring of said other panel taking place at a third station spaced downstream along the predetermined path from said second station.

2. A method of cutting a ribbon of glass into individual glass brackets as the glass ribbon is moved continuously along a predetermined path, which method comprises:

scoring the glass ribbon at spaced intervals across the width of the continuous ribbon so as to define two separate panels in the ribbon, said initial scoring taking place at a first station positioned along the predetermined path;

scoring one of said defined glass panels along the length thereof so as to define a plurality of glass brackets in said one panel, said scoring of said one panel taking place at a second station spaced downstream along the predetermined path from said first station;

scoring the other of said defined glass panels along the length thereof so as to define a plurality of glass brackets in said other panel, said scoring of said other panel taking place at a third station spaced downstream along the predetermined path from said second station; and separating said brackets and said panels by applying a breaking force selectively to said glass ribbon to cause said glass to break along the score lines thereon.

3. The method of cutting a ribbon of glass into individual glass brackets as defined in claim 2 wherein said glass panels are initially separated from one another by applying a breaking force across the width of the glass ribbon, and wherein said brackets of each of said individual panels are then separated from one another by applying a breaking force along the length of the glass panel.

4. The method of cutting a continuous ribbon of glass into individual glass brackets comprising the step of continuously repeating the steps of claim 3 on repeated lengths of the ribbon of glass.

5. A method of cutting a ribbon of glass into individual glass brackets as the glass ribbon is moved continuously along a predetermined path, which method comprises:

scoring the glass ribbon at spaced intervals across the width of the continuous ribbon so as to define two separate panels in the ribbon, said initial scoring taking place at a first station positioned along the predetermined path;

separating said panels by applying a breaking force selectively to said glass ribbon to cause said glass to break along said score lines thereacross;

scoring one of said defined glass panels along the length thereof so as to define a plurality of glass brackets in said one panel, said scoring of said one panel taking place at a second station spaced downstream along the predetermined path from said first station;

scoring the other of said defined glass panels along the length thereof so as to define a plurality of glass brackets in said other panel, said scoring of said other panel taking place at a third station spaced downstream along the predetermined path from said second station; and separating said brackets in each of said panels by applying a breaking force selectively to said one glass panel and then to said other glass panel to cause said glass to break along the score lines thereon.

6. The method of cutting a continuous ribbon of glass into individual glass brackets further comprising the step of continuously repeating the steps of claim 5 on repeated lengths of the ribbon of glass.

References Cited

UNITED STATES PATENTS 3,352,015   11/1967   Galabert _____ 83—7 X

JAMES M. MEISTER, Primary Examiner

U.S. Cl. X.R.

33—32; 83—7, 11; 225—96.5